Feb. 3, 1942.   L. GOLDHAMMER ET AL   2,272,000
CLAW MECHANISM FOR MOTION PICTURE APPARATUS
Filed Dec. 7, 1939

Inventors:
Leo Goldhammer
Willy Kaden
By Their Attorneys:

Patented Feb. 3, 1942

2,272,000

UNITED STATES PATENT OFFICE 2,272,000

CLAW MECHANISM FOR MOTION PICTURE APPARATUS

Leo Goldhammer and Willy Kaden, Munich, Germany, assignors, by mesne assignments, to General Aniline & Film Corporation, New York, N. Y., a corporation of Delaware Application December 7, 1939, Serial No. 307,960
In Germany December 7, 1938

3 Claims. (Cl. 88—18.4)

This invention relates to claw mechanisms for the intermittent movement of motion picture films, which for their reciprocating film-engaging and film-feeding movement are driven by a rotating heart-shaped excentric plate. A claw frame surrounds said plate and is driven by it. Claw mechanisms of this type were usually constructed in such a way, that the claw finger was directly and rigidly connected with the frame surrounding the excentric plate.

According to this invention it is proposed to hinge the claw finger to the claw frame and to mount in a slidingly movable way the part of the claw finger on the opposite side of the claw pins. Such an arrangement and position of the single claw parts has, compared to the former arrangements, the advantage of decreasing the excentric curve and with it the stroke of the claw in order to obtain a short intermittent movement. The necessary pull is effected by the leverage between claw frame and claw finger.

A further advantage of such a claw mechanism is the noiseless movement, even at high speed, and the small space required for the arrangement of the single mechanical parts.

In the accompanying drawing

Figure 1:
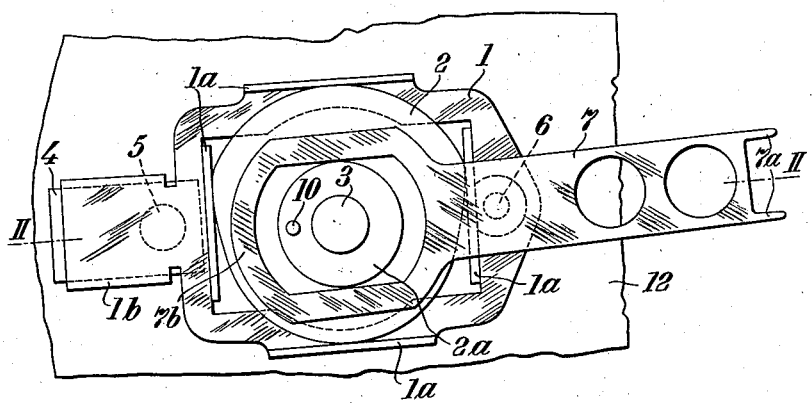
Figure 1 is a top plan view of the new claw mechanism.
Figure 2:
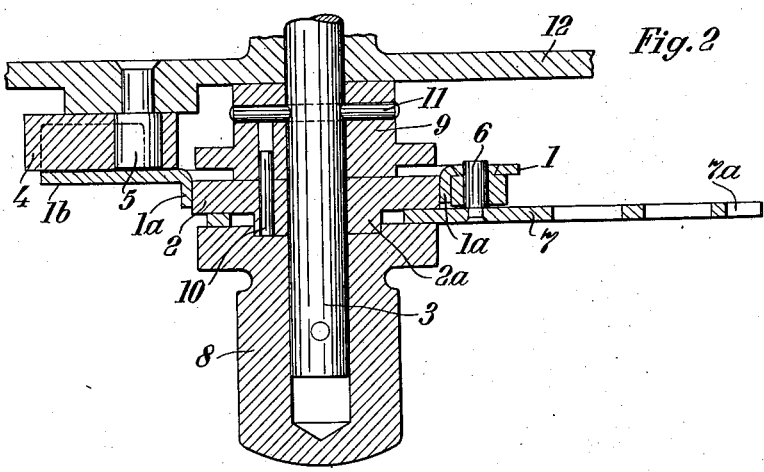
Figure 2 is a cross sectional view along line 2—2 of Figure 1.

The claw frame 1 clasps by its rectangularly protruding edges 1a the excentric plate 2, which is mounted on the axle 3 of the motion picture film projector. The claw frame is slidingly mounted with its part 1b, opposite the film pins, on block 4 pivoted to the base plate 12 at 5. This frame is driven by the excentric plate in a reciprocating film-engaging and film-feeding movement. On part 7 of the claw frame opposite the slidable piece 1b is mounted pivot 6, on which is pivoted the claw finger 7. The pins of the claw, which penetrate into the perforation holes of the film are marked 7a. The part of the claw finger 7 opposite the claw pins 7a is slidingly guided in the pulling direction of the claw by a concentric ring member 2a coaxially mounted on the excentric plate 2 in such a way, that the guiding member 7b of the claw finger clasps the concentric ring member 2a. The capscrew 8 stops the claw finger from sliding off laterally. The claw frame 1 is laterally guided between the excentric plate 2 and the muff 9. Excentric plate and muff are rigidly connected with each other by pivot 10, and muff 9 is firmly wedged by pin 11 with axle 3 of the motion film projector.

We claim:

1. Claw mechanism for motion picture apparatus comprising a base plate, a claw frame having rectangular edges, a heart-shaped excentric disc encircled by and adapted to drive said claw frame, said claw frame being slidingly and pivotally mounted by an adjoining piece on a journal let into said base plate, a driving shaft for said excentric disc, a concentric ring member coaxially mounted with said excentric disc, a claw finger pivoted to said claw frame, said claw finger being slidingly guided by said driving shaft and ring member, said claw finger comprising pins for engagement with the perforations of a motion picture film, and at the opposite end thereof a guiding member slidingly mounted on said ring member.

2. Claw mechanism for motion picture apparatus comprising a base plate, a rotatable driving shaft extending from said base plate, a heart-shaped excentric disc and a concentric ring member on said shaft, a rotatable guide pivoted to said base plate at one side of said shaft, a claw frame slidably mounted on said guide and having rectangular edges encircling said excentric disc for sliding and pivotal movement of said frame by said disc, and a claw finger, one end of which is slidable on said ring member and the other end of which is provided with film-engaging pins, an intermediate point on said claw finger being pivoted to said claw frame on the opposite side of the drive shaft from said guide.

3. Claw mechanism for motion picture apparatus comprising a base plate, a rotatable driving shaft extending from said base plate, an eccentric disc and a concentric ring member on said shaft, a rotatable guide pivoted to said base plate at one side of said shaft, a claw frame slidably mounted on said guide and having means engaging said eccentric disc for sliding and pivotal movement of said frame by said disc, and a claw finger, one end of which is slidable on said ring member and the other end of which is provided with film engaging pins, an intermediate point on said claw finger being pivoted to said claw frame on the opposite side of the drive shaft from said guide.

LEO GOLDHAMMER.
WILLY KADEN.